E. A. PRATT.
APPLIANCE FOR PURIFICATION OF LIQUIDS.
APPLICATION FILED APR. 22, 1915.

1,208,830.

Patented Dec. 19, 1916.

WITNESSES:
Geo C. Pratt
James W. Farrell,

INVENTOR
Edmund A. Pratt
BY

ATTORNEY

UNITED STATES PATENT OFFICE.

EDMUND A. PRATT, OF NEW YORK, N. Y.

APPLIANCE FOR PURIFICATION OF LIQUIDS.

1,208,830.  Specification of Letters Patent.  Patented Dec. 19, 1916.

Application filed April 22, 1915. Serial No. 23,148.

*To all whom it may concern:*

Be it known that I, EDMUND A. PRATT, a citizen of the United States, residing at New York, in the county and State of New York, have invented new and useful Improvements in Appliances for the Purification of Liquids, of which the following is a specification.

My invention relates to improvements in appliances used in the art of purifying liquids, whereby the liquid to be purified is subjected to the action of light for the purpose of effecting sterilization; and has for its object to provide a means whereby any desired quantitative relation is automatically maintained between the opacity or degree of opaqueness of the liquid and the amount of light employed in the purification thereof. This quantitative relation is maintained by varying the amount of light used so that it at all times bears the desired quantitative relation to the opacity of the liquid.

One embodiment of my invention is illustrated in the accompanyng drawing, wherein:—

Figure 1:
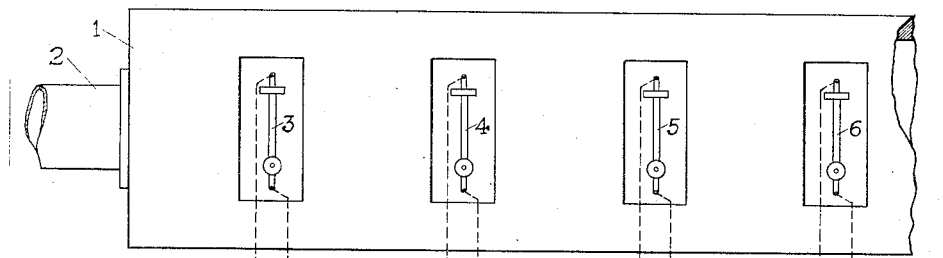
Figure 2:
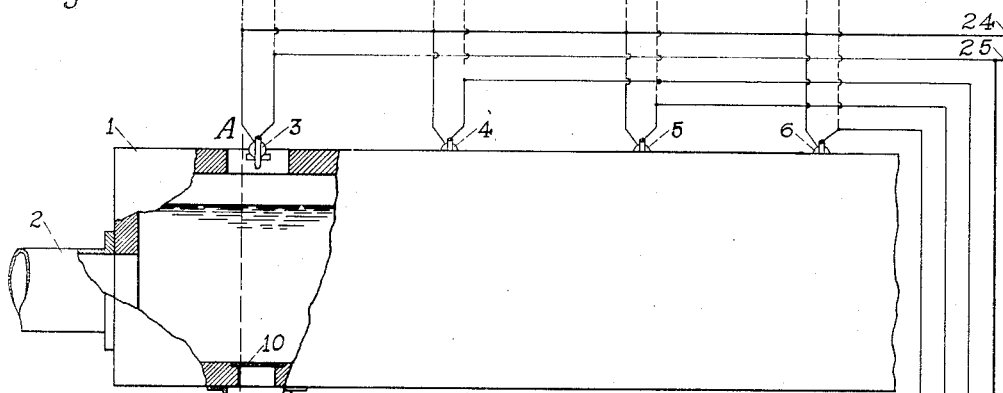
Figure 3:
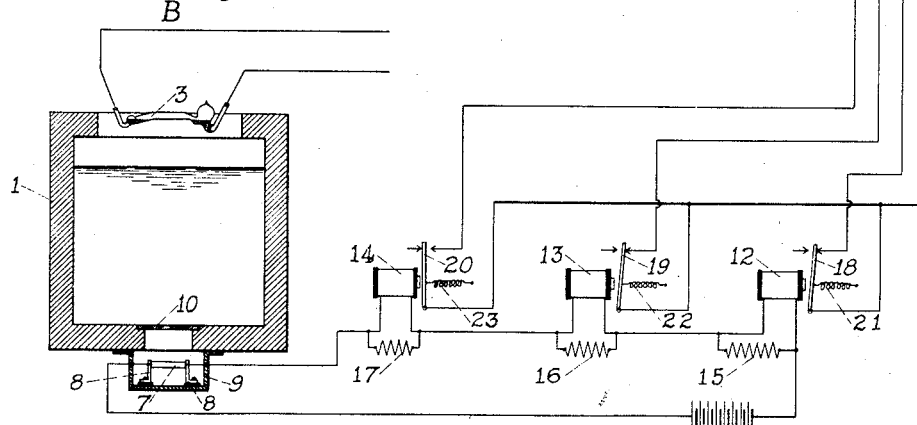

Figure 1 is a plan view of the apparatus. Fig. 2 is a side view of the apparatus of Fig. 1, certain portions being shown in section the more clearly to indicate the arrangement of the constituent parts thereof. Fig. 3 is a cross section in a vertical plane taken on the line AB of Fig. 2, and shows also the electrical connections of the apparatus.

Briefly stated, the apparatus comprises a pipe, flume, or other conduit, or combination of such, through which flows the liquid to be purified. So situated with respect to the liquid to be purified that the rays of light therefrom penetrate the said liquid are electric lamps of a type the sterilizing properties of which are well known in the art. (In the accompanying drawing these sterilizing lamps are indicated to be of the "mercury arc" type, by means of which sterilization can be effected.) The said sterilizing lamps are so arranged that the liquid to be purified passes each in succession; the total time of exposure being determined, for a given rate of flow, by the number of lamps in use. The length of time of exposure required to effect sterilization being dependent upon the opacity of the liquid, a variation in opacity of the said liquid therefore requires a corresponding variation in time of exposure. So situated with reference to a source of light (which may, but need not necessarily, be one of the sterilizing lamps) that the liquid to be purified flows between it and the said source of light, is a substance (generally called a photo-sensitive substance) known to possess the specific property of altering its electrical conductivity in some definite relation to the intensity of light falling upon it. Selenium being a convenient photo-sensitive substance its use in this apparatus is here presupposed. The intensity of the light falling upon the selenium cell being dependent upon the opacity of the liquid to be purified, obviously, the electrical conductivity of the said selenium cell at all times bears a definite relation to the opacity of the liquid. By means of electrical relays connected with the selenium cell and a source of electrical supply the number of sterilizing lamps in use at any time is made to bear a fixed relation to the opacity of the liquid to be purified, which is the principal object of the invention. The following description and specification set forth a preferred method of attaining this result.

Referring to the drawing, the liquid to be purified enters the flume 1 through the pipe 2 and becomes exposed successively to the light from the sterilizing lamps 3, 4, 5 and 6. Situated directly beneath the bottom of flume 1 and in such a position that before reaching it the rays of light from lamp 3 must penetrate the liquid, is the photo-sensitive cell, comprising the selenium rod 7 supported on the standards 8 and inclosed within the light-proof box 9 from which box the selenium rod 7 and standards 8 are thoroughly insulated; light being admitted to the photo-sensitive cell through the transparent plate 10 which forms a portion of the bottom of flume 1. Electrically connected as shown are the selenium rod 7, the battery or other source of electrical supply 11, the relay magnets 12, 13 and 14, and the adjustable resistances 15, 16 and 17. The current generated by battery 11, flowing through this circuit energizes the magnets 12, 13 and 14 which exert magnetic "pull" on their respective armatures 18, 19 and 20. The magnitude of this magnetic pull being dependent upon the intensity of the current flowing through the said magnets, the purpose of the adjustable resistances 15, 16 and 17 is to divert a portion of this current from the magnets 12, 13 and 14 respectively, and thus control at will the relative magnitudes of the pulls of the several relay magnets. The springs 21, 22 and 23 serve to hold the armatures 18, 19 and 20 respectively, in their closed-circuit positions when the pull of the magnets 12, 13 and 14 respectively, is equal to or less than a predetermined minimum for the respective magnet. An increase in pull of any magnet above its predetermined minimum pull overbalances the tension of its spring and causes its armature to be drawn into the open-circuit position.

As shown in the drawing, lamps 4, 5 and 6 are so connected with the relay armatures 18, 19 and 20, respectively, as to be controlled thereby. The depression of an armature due to magnetic pull in excess of the spring tension acts to open the corresponding lamp circuit and thus extinguish the lamp. Lamp 3 is here shown permanently in circuit while the apparatus is in use, and is therefore not under control of the photo-sensitive cell; its terminals being directly connected with the common source of electrical supply for the lamps by means of the conductors 24 and 25.

The resistance 15 is so adjusted that relay magnet 12 operates to start lamp 4 when the opacity of the liquid is in excess of that which will permit of proper sterilization by the use of lamp 3 only. Likewise, the resistance 16 is so adjusted that relay magnet 13 operates to start lamp 5 when the opacity of the liquid is in excess of that which will permit of proper sterilization by the use of lamps 3 and 4 only. Any number of lamps may thus be arranged to operate in succession.

The operation in general of the apparatus is as follows: The liquid to be sterilized passes beneath lamp 3 and its opacity determines the electrical conductivity of selenium rod 7. The number of lamps necessary to sterilize the liquid in this condition having previously been determined and the resistances 15, 16 and 17 adjusted as explained above, the requisite number of lamps are in circuit. For the purpose of elucidation let it be assumed that the opacity of the liquid is such that for effective sterilization lamps 3, 4 and 5 are required to be in operation. This condition is indicated in the drawing. Now, if, for any reason, the opacity of the liquid increases and a greater number of lamps are therefore required for sterilization, the intensity of the light falling on selenium rod 7 decreases, with a resultant decrease in the electrical conductivity thereof and a consequent decrease in current flowing through electro-magnets 12, 13 and 14. The resultant decreased magnetic pull of magnet 14 allows the spring 23 to draw armature 20 into its closed-circuit position, thus lighting lamp 6. Since the magnetic pull of magnets 12 and 13 was previously overbalanced by the tension of springs 21 and 22 a further decrease in the magnetic pull of the said magnets has no effect on armatures 18 and 19, and lamps 4 and 5 therefore remain in operation. Again, if the opacity of the liquid so decreases that lamps 3 and 4 only are required for sterilization, the intensity of the light falling on selenium rod 7 increases, with a resultant increase in the electrical conductivity thereof and a consequent increase in current flowing through electro-magnets 12, 13 and 14. The resultant increased magnetic pull of magnets 13 and 14 overbalances the tension of springs 22 and 23, thus drawing armatures 19 and 20 into their open-circuit positions and extinguishing lamps 5 and 6. Armature 18 remains in its closed-circuit position as the tension of spring 21 is still in excess of the pull of magnet 12.

It is obvious from the foregoing that any number of lamps may be controlled by a corresponding number of relays in circuit with the photo-sensitive cell. In practice the number of lamps required will generally be determined by the maximum opacity of the liquid to be purified, and the number of lamps under the control of the photo-sensitive cell will depend upon the limits of variation of opacity of the said liquid.

It is apparent that the invention is not limited to the use of selenium as the photo-sensitive substance, but may be operated equally as well by the use of any other substance possessing such photo-sensitive properties; nor is it limited to the flume arrangement shown in the drawing but may be employed in pipes carrying water under pressure in a similar manner. Other changes in the details or arrangement of the constituent parts of the apparatus may obviously be made without departing from the spirit of the invention.

Having thus described my invention and illustrated its use, what I claim as new and desire to secure by Letters Patent is the following:

In combination: a flume or other conduit for containing a liquid to be purified; a plurality of sterilizing lamps; a source of light; a photo-sensitive cell, so situated with respect to the source of light that the rays of light therefrom penetrate the said liquid before reaching the said photo-sensitive cell; a source of electrical supply; a plurality of electrical relays, so connected with the source of electrical supply, the photo-sensitive cell, and the sterilizing lamps that the variation of conductivity of the said photosensitive cell caused by the varying opacity of the liquid and acting through the said electrical relays, operates to control the sterilizing lamps; substantially as described in the specification.

In testimony whereof, I have hereunto signed my name in the presence of the two subscribed witnesses.

EDMUND A. PRATT.

Witnesses:
 GEO. C. PRATT,
 JAMES W. FARRELL.